May 27, 1969  F. C. ARRANCE ET AL  3,446,668

INORGANIC BATTERY SEPARATOR AND BATTERY

Filed April 1, 1966

FRANK C. ARRANCE
CARL BERGER
  INVENTORS

BY Max Geldin

ATTORNEY

United States Patent Office 3,446,668
Patented May 27, 1969

3,446,668
INORGANIC BATTERY SEPARATOR AND BATTERY
Frank C. Arrance, Costa Mesa, and Carl Berger, Santa Ana, Calif., assignors, by mesne assignments, to McDonnell Douglas Corporation, Santa Monica, Calif., a corporation of Maryland
Filed Apr. 1, 1966, Ser. No. 539,554
Int. Cl. H01m 3/02
U.S. Cl. 136—6                    16 Claims

ABSTRACT OF THE DISCLOSURE

Battery separator in the form of a sintered porous member consisting essentially of a solid solution of magnesium silicate and a member selected from the group consisting of zinc silicate and iron silicate, for use particularly in high-energy density batteries; and a battery comprising a pair of electrodes of opposite polarity, said separator being positioned between said electrodes.

---

Figure 1:
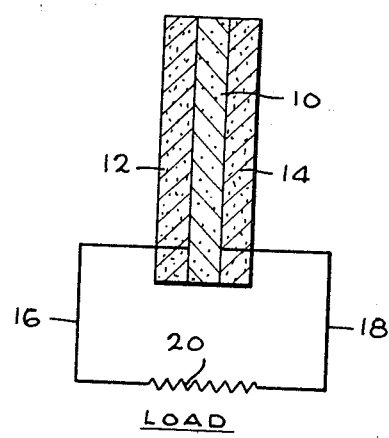

This invention relates to batteries, particularly high energy density batteries, and is especially concerned with improved inorganic membranes or separators for use in batteries, particularly high energy density batteries, such separators having improved strength and resistance to alkali, and good porosity characteristics, with procedures for producing such separators, and with improved battery constructions embodying such improved separators, and which are capable of a large number of charge-discharge cycles at ambient and at elevated temperature and having improved voltage characteristics during discharge.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional batteries, e.g., lead storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In high energy density batteries such as silver-zinc, nickel-cadmium and silver-cadmium, the separator performs the function of retaining electrolyte, e.g., potassium hydroxide, separating the electrodes, and preventing migration of electrode ions or growth of dendritic crystals of electrode ions which short circuit the battery. It has been known to employ organic separators in such batteries, but these have several disadvantages. Thus, such organic separators are not chemically stable, especially at temperatures above 50° C., they tend to swell excessively at elevated temperatures, and most organics are not readily wetted by caustic solutions. Further, organics are not inert to silver oxide in caustic solutions, and organic materials are generally soft and pliable and are subject to puncture by dendrite growth.

Improved inorganic separators particularly suited for use in high energy density batteries are described, for example, in our copending application Ser. No. 499,294, filed Oct. 21, 1965, now Patent No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is a battery capable of operating efficiently over a large number of discharge-charge cycles, and such batteries are also operable at high temperatures, e.g., of the order of 100° C. and above.

However, the continued development of inorganic separators having improved strength and improved resistance to the alkali electrolytes employed in such high energy density batteries, such as potassium hydroxide, and having high porosity, for incorporation in high energy density batteries to obtain improved battery performance, such as high discharge voltage and improved impact, vibration and environmental characteristics, is of particular interest to the industry.

According to the invention, it has now been found that an improved battery separator can be produced, such separator being in the form of a sintered porous member consisting essentially of a solid solution of magnesium silicate and a member selected from the group consisting of zinc silicate and iron silicate.

Referring first to the invention separators composed essentially of magnesium silicate and zinc silicate, it has been found that such separators can be formed by sintering a mixture of zinc-bearing, magnesium-bearing and $SiO_2$-bearing materials, said zinc-bearing and magnesium-bearing materials on heating being capable of forming zinc oxide and magnesium oxide, respectively, in proportions to produce a solid solution of zinc silicate and magnesium silicate. This can be accomplished, for example, by mixing zinc oxide, magnesium carbonate and silica, usually in certain preferred proportions as noted below, and sintering such mixture under temperature and for a period sufficient to produce the above noted solid solution containing zinc silicate and magnesium silicate.

It has also been found that by mixing the sintered material produced as noted above, with an uncalcined or unsintered mixture of, for example, the mixture of zinc oxide, magnesium carbonate and silica noted above, a separator having improved strength yet having controlled porosity characteristics can be produced.

A particular feature of the invention is the production of an inorganic separator according to the invention, which is formed of a solid solution of magnesium silicate and zinc silicate, without melting or development of a liquid phase. It has been found that in order to provide inorganic separators consisting essentially of such a single phase solid solution of magnesium silicate and zinc silicate, the magnesium silicate should be present in such solid solution in an amount not greater than about 40 mol percent.

Thus, it has been found that although a zinc silicate separator is useful, such material does not form a solid solution and on sintering such material, zinc oxide tends to volatilize, leaving silica as a glass which can be attacked by alkali. Such a separator accordingly has inferior resistance to KOH when employed in a high energy density battery. However, it has been found according to the invention that the presence of even a small amount of magnesium silicate together with the zinc silicate, results in formation of a solid solution which tends to "tie up" the zinc and prevents volatilization of the zinc silicate in the presence of such magnesium silicate. But when there is more than about 40 mol percent of magnesium silicate in the solid solution of magnesium silicate and zinc silicate, the excess magnesium silicate above about 40 mol percent tends to crystallize out. This results in the presence of two phases which in the final separator is undesirable in that it develops cracks on temperature changes, and has reduced resistance to chemical attack, and also such a separator has reduced strength. Hence, it has been found particularly desirable to maintain a single phase material according to the invention, in the form of a solid solution of the magnesium silicate and zinc silicate with a maximum approximately 40 mol percent magnesium silicate present.

The magnesium silicate-zinc silicate separator produced according to the invention has high transverse strength, improved resistance to alkali such as KOH, and can be provided with a controlled porosity depending upon the ultimate use of the separator. When incorporated in a high energy density battery such as a silver-zinc battery, it has been found that such a separator results in a highly efficient battery which can be cycled and recycled over hundreds of charge-discharge cycles, at both ambient and elevated temperatures of the order of 100° C. and above, without serious reduction in efficiency. Also, a substantial improvement in voltage performance is observed, the voltage plateau during discharge being higher than the voltage discharge of a similar battery employing other types of separators. Such improved inorganic separator produced according to the invention can be employed in both primary and secondary batteries. However, the use of such inorganic separators in secondary batteries, particularly high energy density batteries, is of particular value. As will be pointed out in greater detail below, the proportions of the components, for example, zinc oxide, magnesium carbonate and silica, employed in producing the improved separator, can be varied to obtain the desired separator structure in terms of strength, porosity and chemical composition. The porosity of the separator can be varied considerably depending on whether the separators are to be used in a primary or secondary battery. For use in a primary battery which has a relatively short life, a separator of high porosity to provide greater activity can be employed, and for secondary batteries, e.g., of the high energy density type, such as a silver-zinc battery, a separator of reduced porosity for providing longer life can be employed. The degree and specific range of porosity which can be provided for the improved zinc silicate-magnesium silicate separators of the invention are described in greater detail hereinafter.

Figure 2:
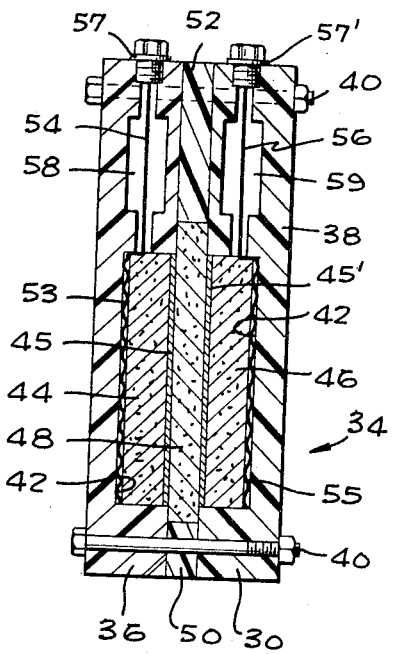

The invention will be further described in relation to the accompanying drawing wherein:

FIG. 1 is a schematic representation of a battery assembly including electrodes assembled in conjunction with a separator produced according to the invention, and FIG. 2 shows the manner of assembly of a separator according to the invention, and electrodes to form a battery according to the invention.

The illustrations of the drawing are exaggerated for purposes of greater clarity.

In carrying out the invention for obtaining the improved magnesium silicate-zinc silicate separator hereof, a mixture of zinc-bearing, magnesium-bearing and $SiO_2$-bearing materials are mixed in proportions to produce a solid solution of zinc silicate and magnesium silicate upon sintering the mixture. For this purpose, any suitable zinc and magnesium compounds can be employed which as result of heat treatment are capable of being converted to zinc oxide and magnesium oxide, respectively. Thus, for example, suitable zinc-bearing materials or zinc compounds which can be employed include zinc carbonate, zinc sulfate and zinc chloride, since these materials upon heating in the presence of air will be converted to zinc oxide. Likewise, suitable magnesium-bearing materials or magnesium compounds that can be employed are, for example, magnesium carbonate, magnesium sulfate and magnesium chloride. Alternatively, the zinc and magnesium compounds employed can be zinc oxide and magnesium oxide. As a source of silicon dioxide, any suitable $SiO_2$-bearing material can be employed. Thus, for example, flint, silica sand or diatomaceous earth can be employed for this purpose.

As previously noted, the proportions of the above three components in the starting mixture are such that upon sintering such mixture, a solid solution of zinc silicate and magnesium silicate is formed, preferably containing not more than about 40 mol percent magnesium silicate. For this purpose, it has been found that the amount of zinc-bearing material or zinc compound which can be employed in such mixture can vary from about 50 to about 75%, usually from about 55 to about 73%, calculated as zinc oxide (ZnO), by weight. The amount of magnesium-bearing material or magnesium compound which is employed can range from about 1 to about 15%, calculated as magnesium oxide (MgO), by weight. The amount of silica ($SiO_2$) which is employed can range from about 20 to about 35%, usually from about 25 to about 30%, by weight. Where the zinc-bearing material or zinc compound is employed in amounts in the upper portion of the range noted above, the magnesium-bearing material or magnesium compound is employed in amounts in the lower portion of the above noted range for this material; conversely, where smaller amounts of the zinc-bearing material or zinc compound are employed within the above noted range for this material, the amount of the magnesium-bearing material or magnesium compound employed is in the upper portion of the range noted above for this component.

If it is desired to form the magnesium silicate-zinc silicate separator according to the invention by a single sintering operation, the above noted mixture, e.g., a mixture of zinc oxide, magnesium carbonate and silica, in the above noted proportions, is first compacted, e.g., at pressure ranging from about 2,000 to about 10,000 p.s.i., into the form or shape of the separator desired, e.g., in the form of a disc. Such compressed separator members or discs are then subjected to sintering at temperature ranging from about 800° C. to about 1,400° C. for a period sufficient to convert the components of the starting mixture into the solid solution of zinc silicate and magnesium silicate described above. This generally requires a period of sintering which can range from about one-half hour to about 10 hours, usually from about 1 to about 5 hours.

The resulting magnesium silicate-zinc silicate separators formed upon sintering have the improved properties noted above, including high strength and good resistance to alkali such as KOH, since the solid solution of zinc silicate and magnesium silicate containing not more than about 40 mol percent magnesium silicate, of which such separators preferably are composed, precludes crystallization of excess magnesium silicate and avoids formation of a two phase system, and substantially all of the silica is held in solid solution and substantially no free silica is present which can be attacked by alkali. Also, the separators so produced have substantial porosity.

However, where only a single sintering operation is carried out to produce the magnesium silicate-zinc silicate separator of the invention, particularly where components such as magnesium carbonate are employed, substantial shrinkage occurs during such sintering opertion and it is difficult to control the size of the separator desired. To more readily control such shrinkage and to produce such separators having dimensions within certain required tolerances, and also to provide a still further improved separator, it is preferred to carry out a second sintering operation. Thus, by mixing preferably a major proportion of the initially sintered material with a minor proportion of the uncalcined or unsintered mixture of the three components in the proportions noted above, close control of shrinkage of the materials during the second sintering operation can be obtained, to permit close control of dimensional tolerances, and closer control of porosity, and further improved properties are thus also imparted to the separator, particularly improved strength.

Thus, according to preferred procedure, the above noted mixture of the three components including suitable zinc and magnesium compounds, and silica, e.g., a mixture of zinc oxide, magnesium carbonate and silica, in the above noted ranges of proportions, can be sintered under the conditions noted above to produce a sintered material, e.g., in the form of a sintered granular material or powder. This sintered material can then be mixed with uncalcined or unsintered starting material, e.g., a mixture of zinc oxide, magnesium carbonate and silica, in the ranges of proportions noted above. As previously noted, in order to reduce shrinkage of the material in the subsequent sintering operation noted below, preferably a major proportion of the sintered material is mixed with a minor proportion of the uncalcined or unsintered mixture. Thus, for example, the amount of sintered material which can be employed can range from about 50 to about 95% by weight of the total mixture, and the proportion of unsintered mixture can range from about 5 to about 50% by weight of the total mixture. Usually, proportions of sintered material in the upper part of the range for this material noted above are employed, e.g., from about 70 to about 90% by weight of the total mixture, and proportions of the unsintered or uncalcined material employed are in the lower portion of the above range for this material, e.g., from about 10 to about 30% by weight of the total composition.

The above noted mixture of sintered and unsintered material is formed into the desired separator shape, e.g., into the form of discs, by compaction, e.g., at pressures of about 2,000 to about 10,000 p.s.i., and the resulting compacted members or discs are then subjected to further sintering. Preferably, such further or second sintering operation is carried out at temperatures ranging from about 1,000 to about 1,500° C., for a period ranging from about one-half hour to about 10 hours, usually from about 1 to about 5 hours.

The second sintering operation results in the conversion of the uncalcined or unsintered material which had been added to the previously sintered material, into the aforementioned solid solution of zinc silicate and magnesium silicate containing not more than about 40 mol percent magnesium silicate, so that the resulting separator member produced following the second sintering operation is essentially substantially entirely in the form of such solid solution. Further, in such second sintering operation, in view of the presence of the major proportion of previously sintered material, the amount of shrinkage of the total material is reduced substantially, and can be closely controlled so that such shrinkage can be of the order of only about 5 to about 20%. The zinc silicate-magnesium silicate separators produced according to the invention have improved characteristics, having a transverse strength ranging from about 4,000 to about 10,000 p.s.i. The porosity of the separator can be controlled to obtain a desired value, so that such porosity can range from about 10% to about 50%. The desired porosity can be obtained by adjusting the proportions of the respective starting materials employed, such as zinc oxide, magnesium carbonate and silica, and the sintering time and temperature utilized.

The magnesium silicate-iron silicate separator of the invention can be produced in substantially the same manner as described above with respect to the magnesium silicate-zinc silicate separator hereof. However, in place of the zinc-bearing material or zinc compound employed in the starting mixture, there is instead employed a suitable iron-bearing material or iron compound, such iron-bearing material being capable of forming iron oxide on heating. Thus, suitable iron-bearing materials or iron compounds which can be employed include, for example, ferrous or ferric sulfate, ferrous or ferric chloride, or ferrous or ferric oxide, or mixtures of ferrous or ferric compounds such as a mixture of ferrous and ferric sulfates. The magnesium silicate-iron silicate separators can be prepared using a single sintering operation or by the preferred dual sintering operation, as previously described.

The proportions of the three above noted components for preparing a magnesium silicate-iron silicate starting mixture generally differ from the proportions noted above with respect to production of a magnesium silicate-zinc silicate separator. For example, about 5 to about 40% of the iron-bearing material or compound calculated as ferrous oxide (FeO), about 5 to about 55% of the magnesium-bearing material or compound calculated as MgO, and about 30 to about 45% of silica ($SiO_2$), can be employed.

Thus, in the sintered separator, small proportions of iron silicate can be present with large proportions of magnesium silicate, and on the other hand, large proportions of iron silicate can be present with small proportions of magnesium silicate, while still forming solid solutions. In other words, the above noted mixtures when sintered at the above noted temperatures of about 800° C. to about 1,400° C. form solid solutions of iron silicate and magnesium silicate when employing a wide range of relative proportions of iron silicate and magnesium silicate.

For example, the resulting magnesium silicate-iron silicate separators formed upon sintering can have a composition ranging from about 10 to about 90 mol percent magnesium silicate and about 90 to about 10 mol percent iron silicate, but preferably have a composition ranging from about 40 to about 60 mol percent magnesium silicate and about 60 to about 40 mol percent iron silicate. As previously noted, the iron silicate can be in the form of ferrous silicate, ferric silicate or mixtures thereof.

The solid solution magnesium silicate-iron silicate separators of the invention can alternatively be produced from certain naturally occurring minerals such as Olivine, a magnesium, iron silicate, by compacting such material and sintering same within a temperature range from about 800° C. to about 1,400° C., to form a solid solution of the magnesium silicate and iron silicate, as noted above.

The resulting magnesium silicate-iron silicate separators produced upon sintering the compacted mixture of starting materials have properties essentially the same as those of the magnesium silicate-zinc silicate solid solution separators noted above, including high strength and good resistance to alkali, and controlled porosity. Such separators can have a transverse strength ranging from about 4,000 to about 10,000 p.s.i. and a porosity ranging from about 10% to about 50%.

Referring to FIG. 1 of the drawing, a sintered zinc silicate-magnesium silicate membrane or a sintered iron silicate-magnesium silicate membrane according to the invention, and represented by numeral 10, has pressed against opposite sides thereof a zinc electrode indicated at 12 and a silver electrode indicated at 14. Wires 16 and 18 connect the electrodes 12 and 14, respectively, to a load 20, thus forming an operative battery.

It will be noted in the schematic illustration of FIG. 1 that the inorganic separator 10 of the invention also aids in supporting the metal electrodes 12 and 14, which are pressed against opposite surfaces of the separator.

The following are examples of practice of the invention:

Example 1

A mixture of 30% flint (silica), 55% zinc oxide and 15% basic magnesium carbonate, by weight, is granulated. The granulated material is then sintered by heating the mixture at about 1,260° C. for a period of 2 hours.

The resulting granulated sintered material is then mixed with the initial uncalcined mixture of flint, zinc oxide and magnesium carbonate noted above, in a proportion of 75 parts of the granulated sintered material and 25 parts of the uncalcined mixture. The resulting mixture of sintered material and uncalcined material is then pressed in suitable dies at pressures of about 5,000 p.s.i. The pressed separators are thus formed into discs and such disc are sintered by heating at 1,425° C. for 2 hours. The resulting sintered separators are in the form of a solid solution of zinc silicate and magnesium silicate, containing just under 40 mol percent magnesium silicate and substantially no free silica.

Such separators have a thickness of about .030 inch.

These separators have a transverse strength of 8,530 p.s.i., and 13% porosity.

Silver electrode material is prepared using equal parts of silver and silver oxide. These materials are thoroughly mixed and pressed at about 5,000 p.s.i. into the form of discs. The compacted discs are cut to size and spot welded to a fine nickel screen.

The silver electrodes are prepared for use by electrolytic oxidation or charging at room temperature in 30% KOH. After forming, the electrode is removed from the charging stand and assembled in a battery as described below.

Zinc electrodes are prepared by mixing about 97 parts zinc oxide and 3 parts HgO, by weight, in a mixer. After mixing, a weighed amount of this material is placed in an electrode compartment in contact with a fine nickel screen, mixed with a small amount of 30% KOH, and electrolyzed.

The separator and electrodes described above are assembled to form a battery as shown in FIG. 2, employing a plastic case 34 formed of two symmetrical, e.g., Teflon, half portions 36 and 38 which are bolted together as indicated at 40. Compartments 36 and 38 of the case have recesses 42 formed therein which receive the zinc and silver electrodes 44 and 46, respectively, prepared as described above. A zinc silicate-magnesium silicate sintered separator 48 prepared as described above is disposed centrally between the case portions 36 and 38 so that the electrodes 44 and 46 are pressed against opposite surfaces of such separators, with a potassium titanate paper 45 inserted between the zinc electrode 44 and separator 48, and a similar potassium titanate paper 45' inserted between the silver electrode 46 and separator 48, to aid in supporting such electrodes, according to the invention described in our copending application Ser. No. 378,859, filed June 29, 1964. However, it will be understood that if desired, such potassium titanate papers can be omitted. Teflon spacers 50 and 52 are provided about the periphery of separator 48, to form a leak-proof seal. Nickel screens 53 and 55 are in contact with electrodes 44 and 46 adjacent to the bottom of the compartment recesses 42, and silver terminal wires 54 and 56 are connected respectively to the screens 53 and 55, and are brought through the plastic electrode sections at the top of the assembly and connected to terminals 57 and 57', as shown. Small electrolyte reservoirs 58 and 59 are provided in the upper portion of the respective electrode compartments 36 and 38.

A battery of the type described above and illustrated in FIG. 2 and containing the separator 48 produced according to the invention has operated for at least 470 cycles at 100° C. at a current density during discharge of 20 ma./cm.$^2$.

The same battery cycled in the same manner but employing a 10 ma./cm.$^2$ current density discharge at room temperature (about 20° C.) has a voltage discharge plateau of about 1.5 volts, whereas the same battery but employing a different silicate type inorganic separator has a voltage plateau of about 1.40 volts at room temperature at 10 ma./cm.$^2$ discharge current density.

This example illustrates the high strength characteristics of the separator produced according to the invention, and that such separator when incorporated in a high energy density silver-zinc battery has a chemical composition and a porosity such as to provide a highly efficient battery capable of operating for a large number of charge-discharge cycles and which is resistant to deterioration of KOH electrolyte.

Example 2

A zinc silicate-magnesium silicate separator is prepared in the manner described in Example 1 above and incorporated in a silver-zinc battery as described above and illustrated in FIG. 2. This battery operates efficiently for 400 charge-discharge cycles at room temperature at 20 ma./cm.$^2$ current density discharge, at a voltage discharge plateau of between 1.5 and 1.53 volts.

Example 3

A zinc silicate-magnesium silicate separator is prepared substantially as described in Example 1, except employing in place of the zinc oxide, magnesium carbonate, silica mixtures of Example 1, mixtures of 66% zinc oxide, 10% magnesium oxide and 30% silica. Also, the sintered material and uncalcined material are mixed in proportions of 60 parts of the initially sintered material and 40 parts of the uncalcined material.

The resulting separator is incorporated in a silver-zinc battery of the type described in Example 1 and illustrated in FIG. 2. Such battery has electrical characteristics similar to the battery formed employing the zinc silicate-magnesium silicate separator of Example 1.

Example 4

A separator according to the invention is prepared by mixing, by weight, 30% flint, 55% zinc oxide and 15% basic magnesium carbonate as in Example 1 above. Such mixture is compacted into a die and formed into discs by pressing at a pressure of about 5,000 p.s.i.

The discs so formed are then subjected to sintering at temperature of about 1,400° C. for about 2½ hours.

The separators so formed are composed of a solid solution of zinc silicate and magnesium silicate, containing about 40 mol precent magnesium silicate and substantially no free silica. Such separators have a transverse strength of about 5,000 to about 7,000 p.s.i. and a porosity of about 15%.

Such separator when incorporated into a zinc-silver battery as described in Example 1 and illustrated in FIG. 2, results in a battery having physical properties and electrical characteristics similar to those for the battery of Example 1 containing the zinc silicate-magnesium silicate separator of Example 1, according to the invention.

Example 5

A battery substantially similar to that of Example 1 and shown in FIG. 2, and incorporating the zinc silicate-magnesium silicate separator described in Example 1 is assembled, except that the electrodes are silver and cadmium.

Such a battery also has physical properties and electrical characteristics on the order of those for the battery containing the zinc silicate-magnesium silicate separator of Example 1.

Example 6

A battery substantially similar to that of Example 1 and shown in FIG. 2, is assembled employing the zinc silicate-magnesium silicate separator of Example 1, except that the electrodes are nickel and cadmium.

Such a battery has physical properties and electrical charactereristics similar to the battery containing the zinc silicate-magnesium silicate separator of Example 1.

Example 7

A magnesium silicate-iron silicate solid solution separator is produced by procedure substantially as described in Example 1, except that the starting mixture is in the form of a mixture of 40% flint (silica), 10% iron oxide calculated as FeO, and 50% magnesium carbonate, calculated as MgO by weight.

The resulting sintered magnesium silicate-iron silicate separator is in the form of a solid solution of these materials. Such separators have a high transverse strength of about 8,000 p.s.i. and 15% porosity.

Such magnesium silicate-iron silicate separator and silver and zinc electrodes prepared as described in Example 1, are assembled to form a battery as described in Example 1 and shown in FIG. 2 of the drawing. The resulting battery operates over at least 500½ hour discharge-½ hour charge cycles at 100° C.

Example 8

Olivine, a magnesium, iron silicate composed of 41.1% $SiO_2$, 49.3% MgO and 6% FeO, by weight, is compacted at about 5,000 p.s.i., and the compacted membranes or separators in the form of dics are sintered by heating at 1,200° C. The resulting sintered separators are in the form of a solid solution of magnesium silicate and iron silicate, containing about 89 mol percent magnesium silicate and about 11 mol percent iron silicate.

These separators have a thickness of about .030 inch, a transverse strength of about 8,000 p.s.i., and 15% porosity.

Such separator and zinc and silver electrodes prepared as described in Example 1 are assembled to form a battery as described in Example 1 and shown in FIG. 2 of the drawing. The resulting battery operates for 750½ hour discharge-½ hour charge cycles at 100° C. at a current density during discharge of 20 ma./cm.$^2$ and a depth of discharge of 20%.

From the foregoing, it is seen that the invention provides procedure for producing strong highly efficient inorganic separators having a chemical composition and structure, which when incorporated into a high energy density alkaline battery such as a silver-zinc battery, permit extended operation at ambient temperatures as well as at higher temperatures of operation of the order of 100° C. and above, without deterioration of these separators by alkali, and at improved power output.

It will be understood, as indicated by Examples 1, 5 and 6 above, that the inorganic separators of the invention can be employed in combination with any desired electrode system, including silver-zinc, silver-cadmium, nickel-cadmium, and the like.

During discharge of batteries such as those illustrated in FIGS. 1 and 2, and described in the above examples, as is well known, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of silver-zinc, silver-cadmium, and nickel-cadmium battery systems, are intended to denote either the respective metals themselves or the corresponding oxides thereof.

While we have described particular embodiments of our invention for purposes of illustration, within the spirit of the invention, it will be understood that the invention is not to be taken as limited except by the scope of the appended claims.

We claim:

1. A battery separator in the form of a sintered porous member consisting essentially of a solid solution of magnesium silicate and iron silicate.

2. A battery separator as defined in claim 1, wherein said solid solution contains about 10 to about 90 mol percent magnesium silicate, and about 90 to about 10 mol percent iron silicate.

3. A battery separator as defined in claim 1, wherein said solid solution contains about 40 to about 60 mol percent magnesium silicate and about 60 to about 40 mol percent iron silicate.

4. In a battery, a battery separator in the form of a sintered porous member consisting essentially of a solid solution of magnesium silicate and a member selected from the group consisting of zinc silicate and iron silicate.

5. In a battery, a battery separator as defined in claim 4, in the form of a sintered porous member consisting essentially of a solid solution of magnesium silicate and zinc silicate.

6. In a battery, a battery separator as defined in claim 5, wherein said solid solution contains not more than about 40 mol percent magnesium silicate.

7. In a battery, a battery separator as defined in claim 5, wherein said solid solution contains not more than about 40 mol percent magnesium silicate, and contains substantially no free crystalline magnesium silicate, and substantially no free silica.

8. In a battery, a battery separator as defined in claim 4, said sintered member having a porosity in the range of about 10% to about 50%, and a transverse strength of about 4,000 to about 10,000 p.s.i.

9. A battery comprising a pair of electrodes of opposite polarity, and positioned between said electrodes for retaining electrolyte, a separator in the form of a sintered porous member consisting essentially of a solid solution of magnesium silicate and a member selected from the group consisting of zinc silicate and iron silicate.

10. A battery as defined in claim 9, wherein said separator is in the form of a sintered porous member consisting essentially of a solid solution of magnesium silicate and zinc silicate.

11. A battery as defined in claim 9, wherein said separator is in the form of a sintered porous member consisting essentially of a solid solution of magnesium silicate and iron silicate.

12. A battery as defined in claim 10, wherein said solid solution contains not more than about 40 mol percent magnesium silicate and contains substantially no free crystalline magnesium silicate, and substantially no free silica.

13. A battery as defined in claim 11, wherein said solid solution contains about 10 to about 90 mol percent magnesium silicate, and about 90 to about 10 mol percent iron silicate.

14. A battery as defined in claim 9, wherein said electrodes are zinc and silver electrodes.

15. A battery as defined in claim 12, wherein said electrodes are zinc and silver electrodes.

16. A battery as defined in claim 13, wherein said electrodes are zinc and silver electrodes.

References Cited

UNITED STATES PATENTS 3,169,072    2/1965    Hummel _____ 106—58 XR

WINSTON A. DOUGLAS, *Primary Examiner.*

D. L. WALTON, *Assistant Examiner.*

U.S. Cl. X.R.

106—58, 60; 136—146